Aug. 25, 1964 F. L. WIER ETAL 3,145,799
STEERABLE DRIVE WHEEL ASSEMBLY
Filed March 1, 1962 4 Sheets-Sheet 2

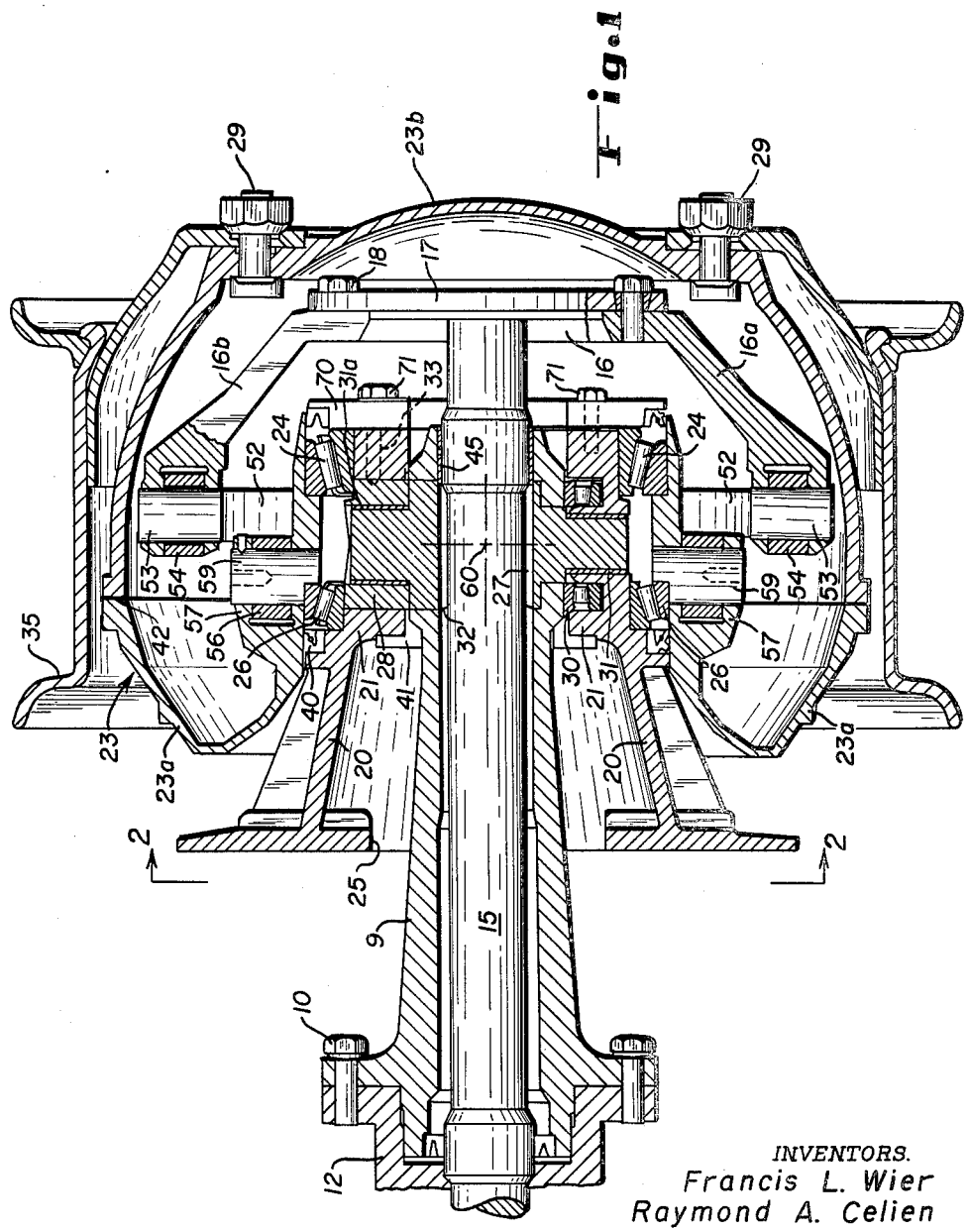

INVENTORS.
Francis L. Wier
Raymond A. Celien
Emmet L. Martin
BY

ATTORNEYS

Aug. 25, 1964  F. L. WIER ETAL  3,145,799
STEERABLE DRIVE WHEEL ASSEMBLY
Filed March 1, 1962  4 Sheets—Sheet 3

INVENTORS
Francis L. Wier
Raymond A. Celien
Emmet L. Martin
BY

ATTORNEYS

Aug. 25, 1964  F. L. WIER ETAL  3,145,799
STEERABLE DRIVE WHEEL ASSEMBLY
Filed March 1, 1962  4 Sheets-Sheet 4
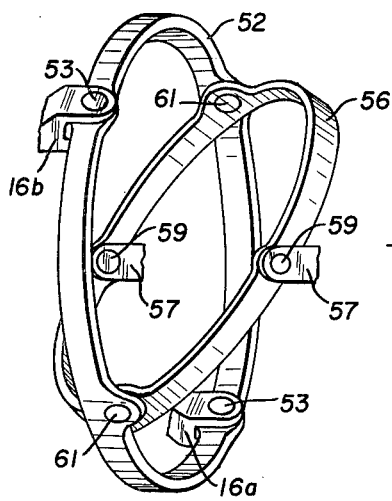
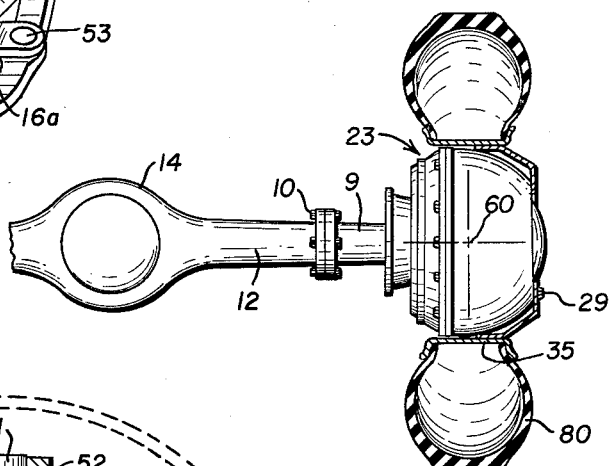
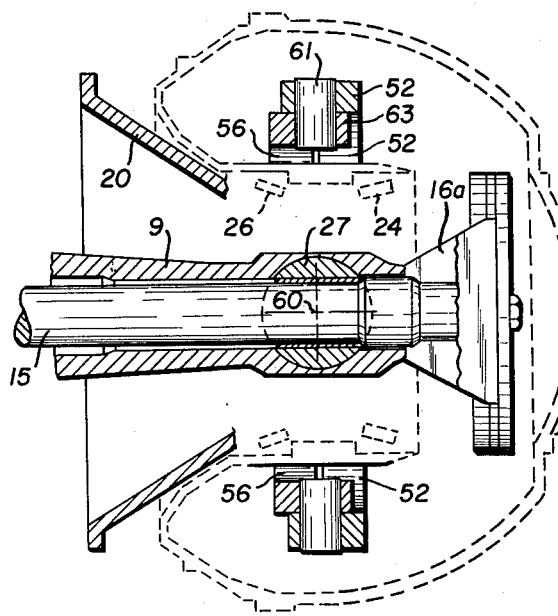
INVENTORS.
Francis L. Wier
Raymond A. Celien
Emmet L. Martin
BY
ATTORNEYS United States Patent Office 3,145,799
Patented Aug. 25, 1964

3,145,799
STEERABLE DRIVE WHEEL ASSEMBLY
Francis L. Wier, Littleton, Raymond A. Celien, Denver, and Emmet L. Martin, Littleton, Colo., assignors to American Coleman Company, Littleton, Colo., a corporation of Nebraska
Filed Mar. 1, 1962, Ser. No. 176,600
2 Claims. (Cl. 180—43)

This invention relates to mechanical movements and in a particular application to universal joints which are arranged in the rotational assembly of wide angle turn, steerable drive wheels.

Vehicles having steerable drive wheels are utilized in increasing numbers for industrial, pleasure and military applications. Some industrial and military vehicles utilize both front and rear steerable drive wheels for propulsion and steering. In most known systems of steerable drive wheels, the construction prevents wide angle turning of the wheels. For example, a non-driving, steerable front wheel generally is pivotable from between 35° to 38° in either direction; but most steerable drive wheels, either front or rear, pivot only 26° to 27° in either direction. Thus, for vehicles which have only front steerable drive wheels, the minimum radius of turn may be considerably larger than is desired in most cases, resulting in turning difficulty. To provide for shorter radius turning, vehicles have been provided with rear steerable drive wheels as well as front steerable drive wheels.

According to the present invention, we have provided wide angle, steerable drive wheels which are arranged to pivot up to about 38° in each direction and which maintain constant velocity of the component parts in the turning joint. In addition, we have provided a center point steerable drive wheel where in essence the weight of the vehicle is carried through a novel kingpin assembly, generally vertically above the axial center of the tire contact with the ground, and providing the wheel with zero degree camber or can provide camber if desired, and stabilizes the wheel againt side thrust. Further, the central pivot point may be positioned slightly off the tire pivot so that the tire rolls around the pivot point when turning instead of pivoting on dead center with tire scuffing, which reduces the force necessary for turning the wheels, resulting in easier and more positive steering.

The device of the invention provides a universal joint having six pivots instead of the usual four. As applied to a steerable drive wheel, the universal joint utilizes a solid, one-piece axle shaft which may extend from the differential to a turning assembly. The design permits the steerable drive wheel joint assembly to be completely enclosed in a sealed housing where components may run in a reservoir of oil or light lubricating grease thus reducing lubrication requirements. The completely enclosed arrangement, further, permits extended operation in water without leaching the lubricant from the assembly.

Since the device may run in an oil bath, if desired, it is possible to interconnect such an oil bath with an oil system of a disc brake mechanism whereby the wheel system provides an adequate reservoir and cooling capacity for the oil brake system. Other types of brakes may be interconnected with the assembly in accordance with standard practices and also sealed against water and other foreign matter. In addition, the configuration of the joint assembly of the steerable drive wheel of this invention is arranged so as to be mounted within the confines of the wheel and tire for protection.

An object of this invention is to provide a mechanical movement of the constant velocity universal type.

Further included among the objects and advantages of this invention is the provision of a universal joint of a constant velocity type, which in one application is used to provide a wide angle turn, steerable drive wheel. The wide angle turn, steerable drive wheel operating mechanism may be completely enclosed within a sealed casing, arranged to run in an oil bath, reducing the normal lubrication and maintenance and providing an assembly which may be used for sustained periods of time under conditions of water immersion. The universal joint, as applied to a steerable drive wheel assembly, may be compactly maintained within the hub of a wheel and thus maintained within the profile of its mounted wheel and tire to thereby protect the assembly from collision damage, mud and the like. Additionally, the invention provides center point steering by means of a novel kingpin turning arrangement in which the pivot point of the wheel may be directly above or slightly spaced from the tire pivot point. In addition, the assembly provides a zero or positive camber if desired. The universal joint assembly positions the pivot points outside the pivot hub in closer proximity to the tire of the wheel giving greater wear and less strain on the parts.

These and other objects and advantages of the invention may be readily ascertained by referring to the following description and appended illustrations in which:

FIG. 1 is a cross-sectional, side elevational view, in partial schematic detail, of a universal joint, showing the construction of the device of the invention as applied to a steerable drive wheel;

FIG. 7 is a similar detail of the mechanism of the steerable drive wheel, in the same turn position of FIG. 6 with the yoke rotated 45° from the position of that shown in FIG. 6;

FIG. 8 is a top plan, partially schematic and partially sectional view of the steerable drive wheel showing the relation of the connecting rings, wheel housing and spindle; and FIG. 9 illustrates diagrammatically an assembly of a wheel mounted on a differential and axle housing for operating a vehicle.

Figure 5:
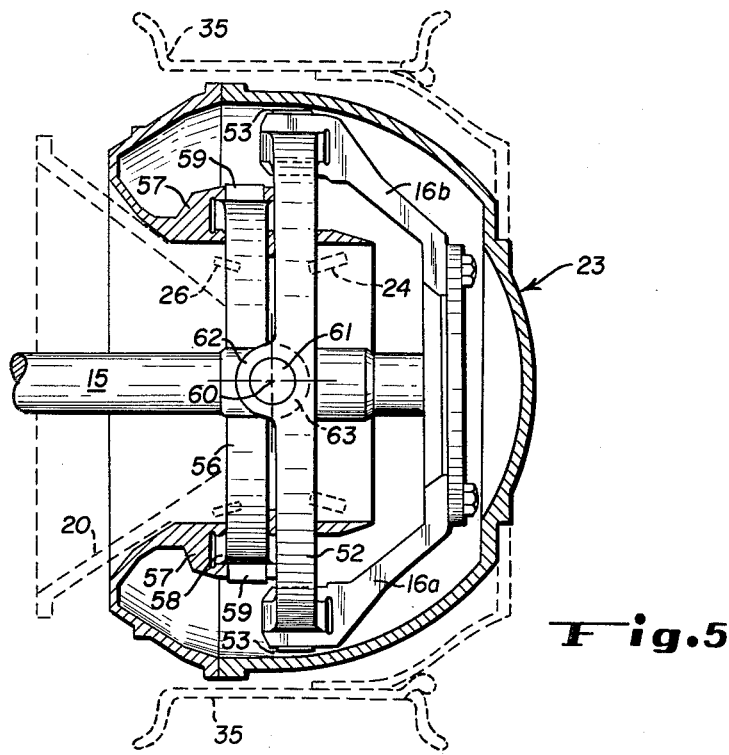
FIG. 5 is a top plan, partially schematic and partially sectional detail of the drive and turn mechanism of the steerable drive wheel of the invention.

The steerable drive wheel assembly illustrated includes a stub axle housing 9 attached by a series of bolt and nut assemblies 10 to an axle housing 12, which is attached to a differential 14, FIG. 9. Such a differential 14 may be a conventional differential and differential housing. A solid, one-piece axle shaft 15, FIG. 8, is mounted in the stub axle housing 9 and it includes an end mounted flange 17, FIG. 1, to which a yoke plate 16 is attached by means of bolts 18, or other suitable fastening means. Yoke arms 16a and 16b, FIG. 5, are integrally secured to the yoke plate and extend angularly back over the axle shaft. Each yoke arm includes a bifurcated end. The axle shaft at its opposite end is connected by conventional means to the differential, such connection not being shown.

A spindle 20, FIG. 1, is mounted over the stub axle housing 9, and it includes an outer portion 21 and an inner, elongated mouth portion 25. A kingpin 27 having an upper cap 28 permits the spindle to pivot. Bearing assembly 30 is mounted between the outer end 21 of the spindle and the stub axle housing in conventional manner for pivotal movement of these parts. Needle bearings (or a bushing) 31 are mounted around the lower portion of the kingpin and a bushing 31a is mounted around the upper portion of the kingpin. A bushing 45 is positioned between the stub axle housing and the axle shaft 15.

An inner bearing set 26 and an outer bearing set 24, mounted in conventional manner, are positioned on the spindle. The wheel support housing assembly, shown in general by numeral 23, includes an annular member 23a rotatably mounted on the bearing sets and a cover member 23b attached thereto. The bearing set 24 is maintained in position by a pressure plate 70 removably secured in place by bolts 71 circumferentially spaced around the plate. The bearing assembly may be aligned, and wear taken up so as to maintain alignment, by means of shims held between the pressure plate and the bearing assembly.

A tire rim 35 is secured to the cover by means of a series of stud and nut assemblies 29. A tire 80 (FIG. 9) may be mounted on the rim in conventional manner. A vehicle wheel may be secured to the cover in similar manner, if desired. A removable disc wheel rim is illustrated, however, other types of rims may obviously be used as may be desired by the user.

The kingpin 27 permits pivoting of the spindle 20 in a plane passing vertically through point 60. By placing the tire rim slightly off center from the center point 60, the tire pivot axis may be spaced from spindle axis passing through the center point, so that the tire rolls around the turn instead of turning on the axis of the spindle scuffing the tire. The vehicle weight on the stub axle housing bears on the bearing set 30. The axle shaft passes through the opening 32 in the kingpin, and a set screw 33 interconnects the spindle and the cap 28.

A steering arm (not shown) interconnects the spindle and steering mechanism in a conventional manner to pivot the spindle about the kingpin and thereby turn the wheel 35 mounted on the assembly. A pneumatic tire 80 is conventionally mounted on the rim of the wheel 35.

The pair of power yoke arms 16a and 16b interconnect the axle shaft, through a yoke plate 16, to a double ring universal arrangement which is interconnected to the wheel support housing 23 for rotation of the attached wheel. The axle shaft 15 is a solid, one-piece shaft, which extends from the outer plate 17 to an inner end, not shown, but which may be interconnected as by a conventional splined manner with the differential.

The driving connection between the power yoke and wheel support housing is a double gimbal mechanism. This mechanism includes a ring 52 pivotally secured to the yoke arms 16a and 16b by a pivot pin 53. An enlarged section 54 on diametrically opposed sides is provided with an opening for each pin. The ends of the yoke arms are bifurcated supporting the enlarged portion therein for pivotal movement. The ring 52 is mounted with its pivot axis (passing centrally of the two pins) spaced on the outboard side of the spindle pivot point 60. A second ring 56, shown in detail in FIG. 5, is pivotally mounted in diametrically opposed, bifurcated mounts 57 which are integral parts of the wheel support housing 23. An enlarged portion 58 on opposed sides of the ring are each provided with an aperture accommodating a pivot pin 59. The ring 56 is, likewise, offset from the spindle pivot point 60 but on the inboard side, and the offset of these two rings from the pivot center provides one means of increasing the angle of turn of the wheel. It is to be noted that the wheel must be turned several degrees before either the pins on ring 52 or the pins on ring 56 reach a vertical plane passing through the center point 60. This provides an additional angle of turn as the geometry of the yoke arms and the wheel support housing is to a large extent a limiting factor on the angle of turn.

Figure 3:
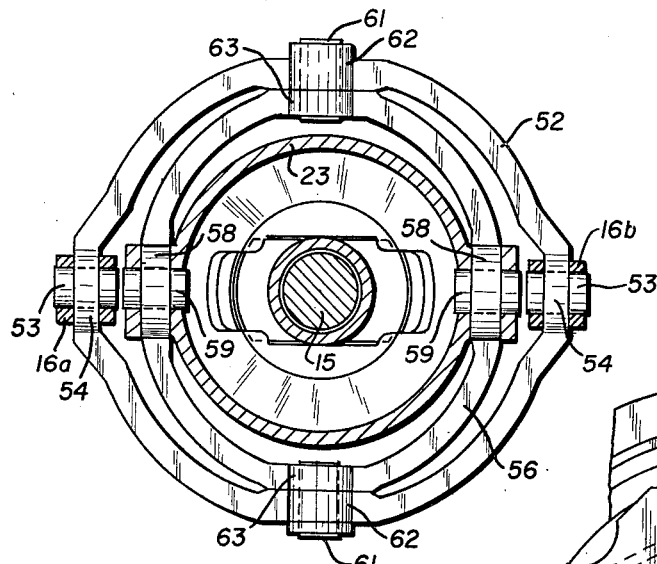
FIG. 3 is a schematic view of the connecting drive mechanism according to the invention.

The two rings are interconnected by opposed pivot pins 61 (shown in detail in FIGS. 3, 5 and 8) mounted in opposed offsets 62 on ring 52 and opposed offset 63 on ring 56. The ring connections are centered 90° from the yoke connection with ring 52 and the wheel support connection with ring 56. Each ring is, therefore, free to pivot about a diameter. The ring 56 is smaller than ring 52 and is arranged to freely pivot inside the outer ring 52.

This pivotal double ring assembly is a double gimbaled connection between the power yoke which rotates in a fixed plane perpendicular to the axis, and the wheel support housing which rotates in a plane having a variable angle of incident with axle shaft. This variable angle extends from a full turn in one direction through a plane perpendicular with the axle shaft (when the wheel is running in a straight line) to a full turn in the opposite direction. These rings rotate in parallel planes when the wheel is running in a straight line and in a pivotal plane when the wheel is in a turn. These rings pivot in the manner of a conventional double gimbal to maintain the predetermined positions of the driving member (the yoke) and the driven member (the wheel support housing).

Figure 6:
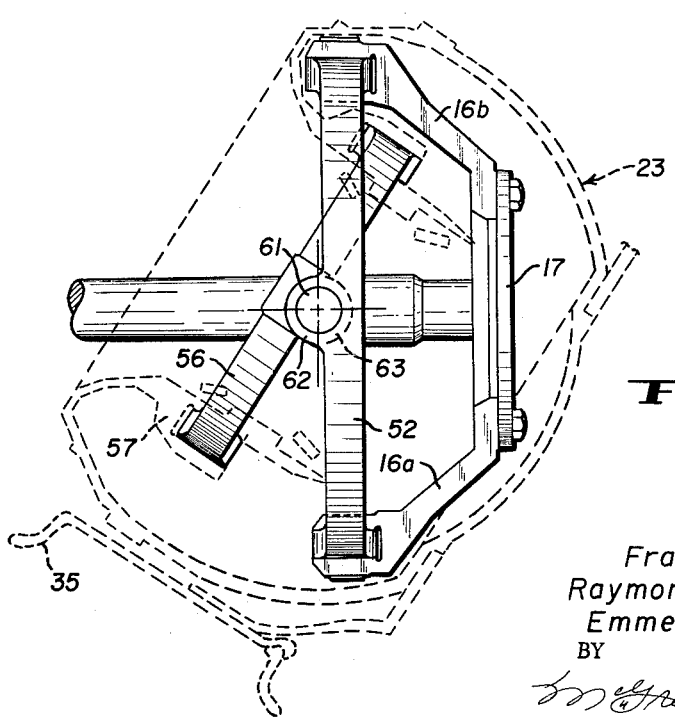
FIG. 6 is a top plan, partially schematic and partially sectional view of the steerable drive wheel in a turn, showing the relation of the connecting components of the universal joint in one point of its rotation.

The top plan view of FIG. 5 shown the wheel in straight line relation to the axle shaft, with the two rings in parallel relation. In FIG. 6 the wheel is shown in full turn with one side the inner ring 56 pivoted in the outer ring. As the yoke and wheel rotate the rings must pivot about their pivots to maintain the relative angular position between the yoke and the wheel mount housing. FIG. 7 illustrates one position of the yoke about 45° from the horizontal position shown in FIG. 6.

In a turn the relation between the yoke and the ring 52 provides a non-constant speed connection. In the same manner, the connection between the ring 56 and the wheel support housing is a non-constant speed connection. This is due to the different angular relations of the pivoting rings and the ring support member. With the two rings interconnected, however, the non-constant speed cancels out and there is a substantially constant speed connection. Thus the wheel support housing rotates at the same speed as the axle shaft in any angular relation of the two members.

Figure 2:
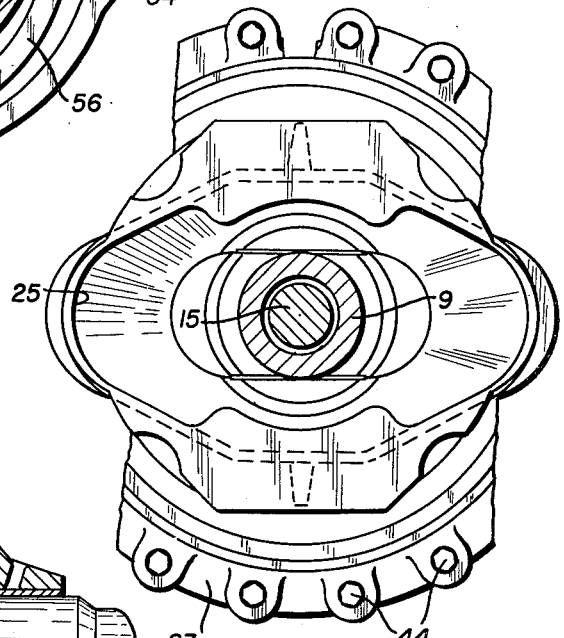
FIG. 2 is an end view, partially in section and partially schematically of one end of the device of FIG. 1 taken along section line 2—2.
Figure 4:
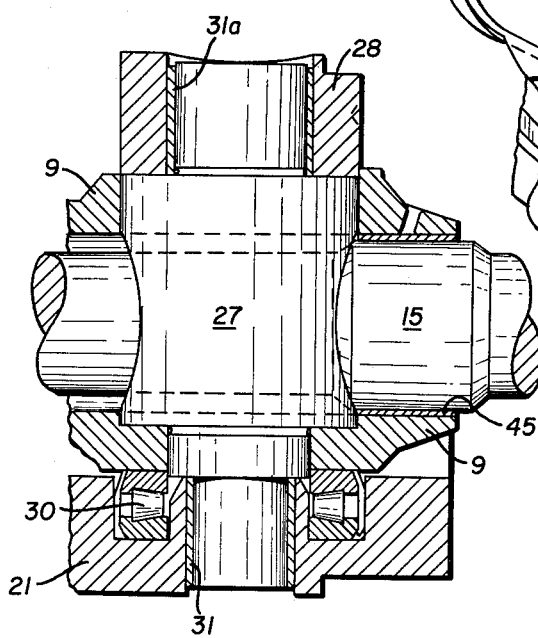
FIG. 4 is an enlarged detail, in partial section, of a kingpin supporting mechanism of a steerable drive wheel.

The support housing members 23a and cover 23b cooperate to form a completely sealed unit including an annular seal 42 between the two parts. This unit is sealed to the spindle by an annular seal 40 and the spindle is sealed to the stub axle housing by a seal 41. The housing and cover are secured together by means of the bolts 44 (FIG. 2). This enclosed and sealed unit may be utilized to maintain a reservoir of oil in which the internal moving parts may run. During operation the rotating yoke arms and rings dip into the oil reservoir, oil splashes and is carried up to fall and drip on parts not immersed in the oil. A bushing or sleeve bearing 45 between the kingpin and axle shaft and bearings 24, 26 and 30 may be lubricated in this manner.

The schematic top plan view of FIG. 8 illustrates the relation between spindle 20, and its mounting on kingpin 27, to the axle shaft 15. The spindle 20 pivots in both directions on the kingpin about kingpin axis 60, one such position being shown in FIG. 6. The wheel support housing 23 roatates on its bearing assemblies 24 and 26 (all shown in dashed lines in FIG. 6) mounted on spindle 20 is maintained in its relative position with the spindle. Thus, the wheel rotates in a single plane perpendicular to the spindle. The spindle and the carried wheel support pivot in relation to the fixed axle for turning. A plane radially through the wheel support housing 23 changes angular position with respect to the yoke when the spindle is pivoted since the yoke is fixed relative to the axle. The ring universal members 52 and 56 which interconnect the yoke and the wheel support housing must continually oscillate in their pivots when the wheel is turning, as in a conventional double gimbaled connecton, to accommodte relative angular position between the wheel and the axle.

In the initial explanation of the invention it was suggested that wet disc brakes could be utilized; in which a reservoir of oil in the assembly housing provided additional oil supply and for additional cooling for the brakes. It should be understood that separate dry disc or drum brakes or conventional shoe brakes may be attached or mounted to the spindle within our concepts.

The kingpin is arranged to support the spindle within close tolerances, and the wheel support housing may be supported so that the mounted wheel and tire are at zero camber or at a positive or negative camber if desired. While the yoke is shown attached to the outer ring, giving a longer torque arm, it could be attached to the inner ring, giving a shorter torque arm. Also, the rings may be of a shape to meet special conditions, and the connection between the rings may be a line with two pivot pins or a single pin, as shown, to provide desired configuration. By using a ball joint instead of the kingpin, a multi-plane joint will result.

While the invention has been illustrated by reference to specific details, there is no intent to limit the spirit or scope of the invention to these precise details, except as defined in the following claims.

We claim:

1. In a steerable drive wheel assembly having a rigid axle shaft enclosed in and extending beyond a housing, a spindle pivotally mounted on said housing adjacent the outer end of said axle shaft, a wheel support housing mounted for rotation on said spindle, said support housing arranged for conjoint angular pivotal movement with the spindle, the improvement which comprises a double gimbal interconnection between said rigid axle shaft and said wheel support housing, said double gimbal interconnection arranged to transmit rotary motion from said shaft to said wheel support housing through angular pivotal movements thereof, said double gimbal interconnection including a pair of rings, one ring being smaller and pivotally interconnected inside the other, both said rings being mounted over the spindle and adjacent to the pivotal axis of said spindle, and one said ring spaced to one side and the other ring spaced on the opposite side of the pivotal axle of said spindle.

2. A steerable drive wheel assembly including an axle shaft and an axle housing, said axle shaft extending outwardly beyond said axle housing and enclosed within a unitary and sealed wheel support housing, a spindle pivotally mounted on said axle housing adjacent the outer end of the axle shaft and extending internally of said wheel support housing, said support housing arranged for conjoint increments of pivotal movement with said spindle, a stationary king pin having a substantially vertical longitudinal axis mounted on the axle housing with said axle shaft passing through a bore therein, said king pin arranged to provide pivotal movement of said spindle, a yoke extending back over said axle housing secured to the end of said axle shaft and rotatable therewith, first ring means pivotally mounted on said yoke and pivotal in a first single plane, second ring means pivotally mounted on said first ring means and pivotal in a second single plane which is 90° from said first single plane, pivotal means interconnecting said second ring means and the wheel support housing to provide a double gimbaled interconnection between said wheel and said wheel support housing and mounted over the end of said axle housing, said king pin being arranged generally centrally of the wheel support housing, and said first and second ring means being mounted inwardly of the end of said axle shaft equally spaced on opposite sides of and adjacent to a line passing through the pivotal axis of said king pin.

References Cited in the file of this patent

UNITED STATES PATENTS

| | | |
|---|---|---|
| 1,429,271 | Barker | Sept. 19, 1922 |
| 1,613,065 | Trott | Jan. 4, 1927 |
| 1,619,672 | Holmes | Mar. 1, 1927 |
| 2,346,842 | Holmes | Apr. 18, 1944 |
| 2,421,007 | Buckendale | May 27, 1947 |
| 2,822,880 | Gregory | Feb. 11, 1958 |
| 2,858,897 | Sibley | Nov. 4, 1958 |
| 3,078,943 | Yadon | Feb. 26, 1963 |